United States Patent [19]

Persoon et al.

[11] Patent Number: 4,627,021

[45] Date of Patent: Dec. 2, 1986

[54] INTEGRATED PROCESSOR FOR THE PROCESSING OF WORD-WISE RECEIVABLE DATA

[75] Inventors: Eric H. J. Persoon; Christian J. B. O. E. Vandenbulcke; Eddy A. M. Odijk; Eduard F. Stikvoort, all of Eindhoven, Netherlands

[73] Assignee: U.S. Philips Corporation, New York, N.Y.

[21] Appl. No.: 589,243

[22] Filed: Mar. 13, 1984

[30] Foreign Application Priority Data

Dec. 6, 1983 [NL] Netherlands ................. 8304186

[51] Int. Cl.[4] ............................................ G06F 7/52
[52] U.S. Cl. ............................................ 364/900
[58] Field of Search ... 364/200 MS File, 900 MS File

[56] References Cited

U.S. PATENT DOCUMENTS 4,130,879  12/1978  Cushing .......................... 364/748
4,238,833  12/1980  Ghest et al. ..................... 364/760

Primary Examiner—Eddie P. Chan
Attorney, Agent, or Firm—Jack E. Haken; James J. Cannon, Jr.

[57] ABSTRACT

An integrated data processor which includes a multiplier element provided with non-symmetrical operand inputs and an arithmetic and logic unit which is connected to the output of the multiplier element by way of a connection over the full product width. The ALU also comprises an accumulator device. Multiple-precision operations can thus be performed on the quantities received on each of the two inputs of the multiplier element. The data processor is notably suitable for performing each time identical operations on sequentially arriving signal quantities.

13 Claims, 11 Drawing Figures $$x = (d + d \times 2^{-22}) \times (c + \bar{c} \times 2^{-11})$$

INTEGRATED PROCESSOR FOR THE PROCESSING OF WORD-WISE RECEIVABLE DATA

BACKGROUND OF THE INVENTION

1. Field of the Invention

The invention relates to an integrated data processor for the processing of word-wise receivable data, comprising:
- a. a multiplier element (48) featuring a first input having a width of n bits, a second input having a width of at least substantially 2n bits for receiving two operands to be multiplied, and a first output for presenting a product;
- b. an arithmetic and logic unit (50) featuring a third input and a fourth input for receiving two further operands, and a second output for presenting a result operand;
- c. a read/write memory (32) for the storage of data;
- d. a control memory (60, 66) for the storage of control information, and
- e. data connection circuits for connecting said components to one another and to the environment.

2. Description of the Prior Art

A data processor of this kind is disclosed in U.S. Pat. No. 4,511,966 spection assigned to Sony Corporation. Such a processor is notably, but not exclusively suitable for the execution of a variety of operations on data representing digitized acoustic signals, for example, a signals generated during the reproduction of records on which the data is stored in the form of optically detectable deformations in a reflective layer accommodated on a disc which is driven at a uniform rotary speed and which is also referred to as a "Compact Disc". The invention, however, is not restricted to the use with such a storage disc. The value of n is determined by the application in question. Suitable values are, for example 8, 10 or 12 bits. "At least substantially equal to 2n" is to be understood to mean herein a range of values having a lower limit 2n and an upper limit which is determined by the application, for example 2n, 2n+1, 2n+2, but which is definitely smaller than $2\frac{1}{2}n$.

Data is to be understood to mean herein data which qualifies (can qualify) for further processing; this further processing can take place within the data processor as well as outside the data processor. Control information is to be understood to mean information which is (can be) repeatedly used without modification; it may concern program data as well as coefficient data. In the long term it may sometimes be necessary to modify this control information; the memory may then be a "read mostly" memory having a write cycle which is, for example substantially longer than the read cycle. On the other hand, the program may be stored in a read only memory, the coefficient data being accommodated in a read/write memory. The known data processor has drawbacks. For example, between the multiplier element and the arithmetic and logic unit there is arranged a multiplexer structure which may give rise to throughput problems when different data arrives simultaneously. It has also been found that the precision is inadequate for some applications; for the data supplied via the first and the second input, this precision equals exactly the width (in bits) of the first and the second output, respectively; for the product it is equal to the width of the product output, but never higher than the definition of the widest input.

It is an object of the invention to provide an integrated data processor which allows for flexibility in the operations in the time domain (reduction of contention problems for the data connection means) as well as in the amplitude domain (enabling an increased precision it will be demonstrated that this increased precision can be achieved for the data applied to the multiplier element via the first input as well for the data applied thereto via the second input.

SUMMARY OF THE INVENTION

The object is achieved in accordance with the invention in that:
- f. said data connection means comprise internal bus connection means (74) having a bit width which at least equals that of the second input;
- g. said first output is coupled over a first full product width to said third input, said second output being coupled to said fourth input over a second full product width via an accumulator register (54);
- h. said second output is connected to said bus connection means by way of a multiplexed result register (52);
- i. in order to generate data with a bit precision which is substantially higher than the bit width of the second input, the data processor features at its second output parallel-connected more-significant and less-significant registers for connection to a bus connection, between the second output and the fourth input there being provided a shift control element in order to present a provisional product over a multi-bit step, shifting to the less-significant bit position side, back to the arithmetic and logic unit.

The precision can thus be readily enhanched in steps amounting to more than 1 bit; it has been found that for the first input these steps may easily be, for example (n−1) bits. "Full product width" is to be understood to mean herein a bit width in a range of values having an upper limit which equals the sum of the widths of the first and the second input, and a lower limit which is not much smaller, but at least equal to the sum of the width of the second input and half the width of the first input. The second full product width may then be equal to the first full product width, but this is not necessarily so; as will appear from the embodiment to be described hereinafter, additional bit positions may be added for given purposes.

Various posibilities exist as regards the result register: the input may be constructed so as to be parallel to the input of the accumulator register, so that two registers are required; a further possibility consists in that an output of the accumulator register is also connected to the bus connection means in a multiplexed manner. The more/less-significant registers, of course, are used for mutually exclusive selections from the result bits. Thanks to the described organization, first a less-significant part of an accumulation result can be determined and subsequently, in as far as is necessary and relevant, each time a more significant part (parts). For the first input the precision can be increased in steps of at the most (n−1) bits. A corresponding, larger width of the significance step is applicable to the second input (substantially, for example in steps of at the most (2n−2) bits). These limits (2n−2), (n−1) are applicable notably to a form of two's-complement notation to be described hereinafter with reference to the embodiment.

FURTHER ASPECTS OF THE INVENTION

Preferably, between the bus connection and said first input there is also included a sign resolver (42) in order to determine the sign of a data quantity in two's-complement notation transported on the data bus so as to activate, by transferring the sign information to the first input, a non-linear operation on data receivable on the second input. Non-linear operations are to be understood to mean operations which are logically controlled by the sign, such as a rectifying operation on a signal quantity. It has been found that for many kinds of data such non-linear operations represent a welcome addition to the range of feasible operations. The sign may be formed as SIGN ($+\frac{1}{2}$, $-\frac{1}{2}$), that is to say as a representation of this sign at the most-significant bit position but one, but other possibilities also exist.

For the execution of an operation on a number of data words occupying predetermined relative positions in the receiving sequence, said operation forming part of a series of operations where the sets of data words to be processed are shifted each time over one increment value in the receiving sequence, the read/write memory preferably comprises first means for storing a preset value, second means for incrementing said preset value by the increment value, and a full adder for forming a number of absolute address values by addition of the prevailing preset value and the relative address values received. Filter operations are performed, for example on a number of successive signal values which are successively stored in the read/write memory. The preset value then provides as if it were a value along the time axis. The results of successive operations of the series are thus always related to a position along the time axis. The preset value is then incremented for each subsequent operation of the series. The same relative addresses can then be used for each element of the series, so that the organization is simplified. It is to be noted that a data word may occupy several memory locations, so that several address calculations are required for such a word. Another solution consists in that the preset value is determined by addition for each subsequent operation of the series, the absolute addresses being formed by successive incrementation of a counter loaded with the preset value.

When the control memory contains a foreground page for the control of current operations and a background page for the storage of updated control data, said control memory preferably comprises a fast copying facility for sequentially transferring the data of a background page updated last to the foreground page under the control of an "end of update" signal. It is thus continuously ensured that the most recent control data are available for the control of the operations. The modification information often becomes available at unpredictable instants. Updating is now systematical thanks to the described organization. In accordance with said state of the art, updating is achieved by interchanging the functions of foreground page and background page. However, in that case it is necessary to update each updated information again. For the solution chosen herein for the execution of an operation which forms part of a series operation, said fast copying facility is preferably effected in synchronously with an operation of said series, the background page then being controlled as the foreground page. Each operation accesses the same series of addresses of the control memory and generally only the addresses to be accessed during a next operation will be updated. Just before that the foregound page is also updated and no time is lost. The background page is subsequently available again for further updating.

BRIEF DESCRIPTION OF THE FIGURES

The invention will be described in detail hereinafter with reference to some Figures: first a preferred embodiment will be described in general, together with an example of an algorithm and the data structure. Subsequently, the various components will be described.

GENERAL DESCRIPTION OF A PREFERRED EMBODIMENT

Figure 1:
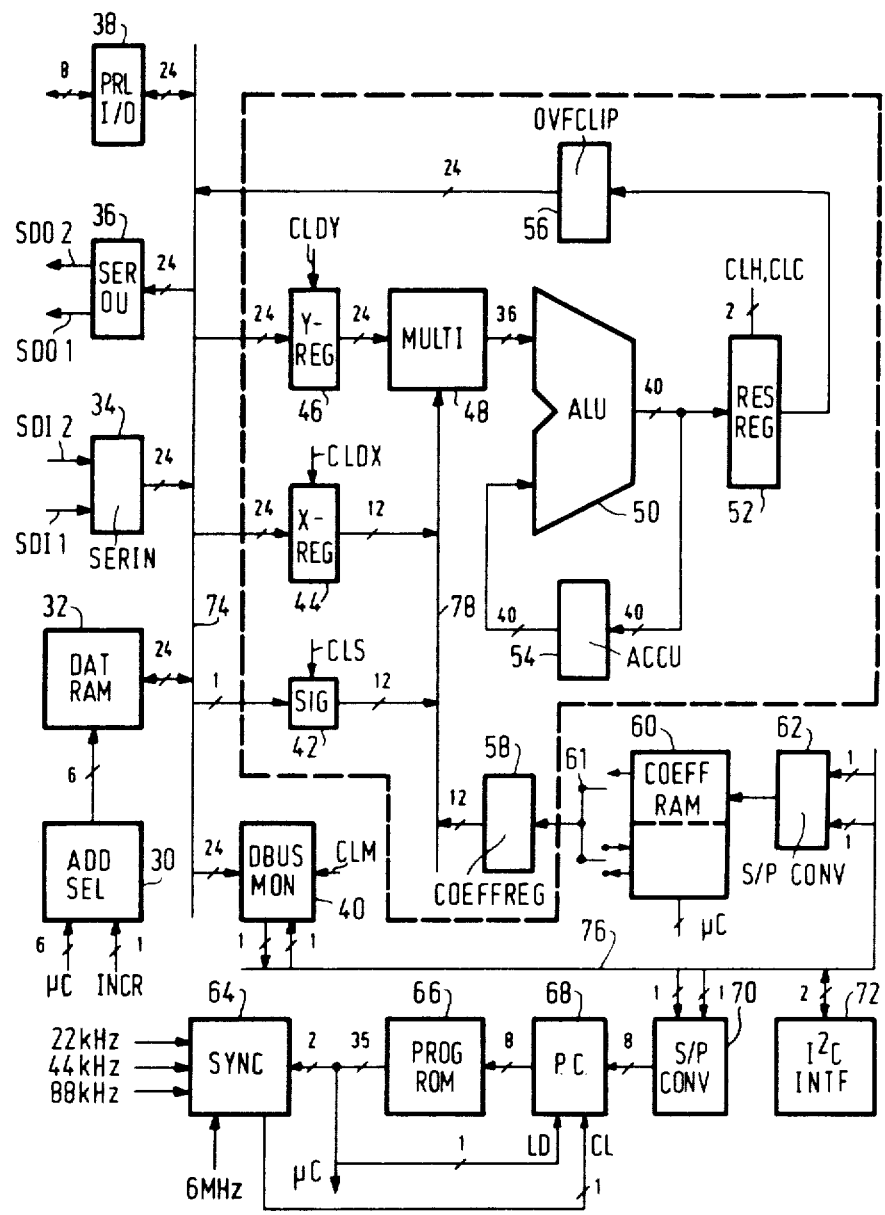
FIG. 1 shows a general block diagram of a digital signal processor.

FIG. 1 shows a general block diagram of a digital signal processor in accordance with the invention. The entire signal processor is accommodated on a single substrate surface; this can be achieved by means of a known technique. The construction as an integrated circuit becomes apparent at the system level by the choice of data input/output mechanisms regarding the environment. The processor is especially designed for the high-speed processing of algorithms such as used particularly for digital audio signals. A large part of the sub-systems is grouped around the data bus 74 which in this case has a width of 24 bits. Data can be exchanged notably bidirectionally with the environment via input-/output member 38 which comprises a byte-organized (de)multiplexer and which will be described in detail hereinafter. Also provided is a serial input member 34 which comprises two connections SDI 1, 2 having a width of 1 data bit, and a serial output member 36 which comprises two connections SDO 1, 2 which also have a width of 1 data bit. Control connections have been omitted for the sake of brevity. Several data processors of this kind can thus exchange data. The elements 34, 36 also comprise a (de)multiplexer structure for adapting the bit serial connections to the data bus 74 having a width of 24 bits. The data received is temporarily stored in a random access read/write memory 32. Intermediate data of the processing elements to be described hereinafter or final results awaiting output to further parts of a system can also be stored therein. The memory 32 has a capacity of 64 words of 24 bits each. The addresses are supplied by an address selection unit 30 which comprises an address input for receiving an address having a width of 6 bits, and an increment input having a width of 1 bit. The addresses and increment signals are supplied by the program memory 66 to be described in detail hereinafter. The addresses received are added to the value of the position of an address counter for a preset address, said counter being included in the address selector. To this end, the address selector 30 also comprises a full adder having a width of 6 bits. The mode control signals for the address selector and the six-bit relative addresses are also supplied by the program memory 66. The data stored in the memory 32 can be delayed as if it were by incrementation and decrementation in order to be inserted in various positions in the formulae of the operations to be executed. Successive operations can thus produce a time sequence of result quantities. In this manner it is not necessary to shift data to and fro in the memory 32.

Prior to processing, the data can be stored in one of the registers 44, 46, each of which has a capacity of 24 bits. The load control signal is separately shown. The register Y is connected to a 24-bit wide input of the multiplier element 48. An example of such an element is described in Patent Application GB 2,030,743 and the corresponding U.S. patent application Ser. No. 228,887, filed Sept. 4, 1979, now abandoned. The X-register 44 can apply, as desired, the 12 most-significant or the 12 least-significant data bits to the multiplier element 48 via a 12-bit wide intermediate bus 78. This bus is proportioned in accordance with the length of the coefficients to be supplied by the coefficient memory 58. This memory comprises two memory banks for a foregound page and a background page, respectively. Each bank has a capacity of 64 12-bit words. The coefficient memory can be addressed in two ways: first of all by means of a 6-bit address which is derived from a microcode word read from the memory 66. The addresses can also be supplied via the series parallel converter 62 which is fed by the control bus 76. This bus is connected to the environment via the interface unit 72. The latter is externally connected to an external bus of the I²C-type described in U.S. patent application Ser. No. 317,693, filed Nov. 2, 1981. The latter is used notably if, for example, the nature of the data changes due to changing circumstances; this nature concerns, for example the characteristics of the audio data. The external I²C connection is not separately shown. The external bus supplies 8-bit bytes which are operative for the memory 60, notably for the background page thereof (the upper half in the Figure). The first byte forms a start address: two of the 8 bits are ignored. The second byte forms the first part of the first data word (8 bits). The third byte forms the second part of the first data word (4 bits) plus the first part of the second data word (4 bits). The fourth byte forms the second part of the second data word (8 bits), the series thus being continued until the data source also supplies a termination signal. The addresses in the memory 60 are incremented for each new data word until an external new address is input. This input takes place in the background page of the memory 60. The double switch 61 then occupies its lower position, so that the foreground page supplies information (addressed by the program memory) for the register 58. The foreground page and the background page are then separately addressed; the necessary read (foreground) and write (background) control signals are not separately shown. The termination signal of a series of updating operations initiates the copying of the updated data on the foreground page (if necessary). The double switch 61 is subsequently set to its upper position; the foreground page and the background page are then simultaneously addressed, read operations then taking place in the background page and write operations in the foreground page. The functions of foreground page and background page are thus actually temporarily interchanged. After completion of the operation, the switch 61 is switched over again and a subsequent updating operation may commence. For each address read one twelve-bit coefficient is stored in the register 58. The multiplier element 48 multiplies a quantity having a width of 12 bits by a quantity having a width of 24 bits, and outputs a product having a width of 36 bits. The output of the multiplier element 48 is connected to one input of the arithmetic and logic unit (ALU) 50. This unit has an operating width of 40 bits, so that 5 bits (40−36+1) are available for storing a larger operand value without giving rise to an overflow condition which would involve loss of information; this is because repeated accumulation may lead to a substantially higher accumulation value in given circumstances. Before the result is transported to the bus 74, it is then necessary to perform a renormalization to 24 bits or a division into parts comprising at the most 24 bits each.

The output of the ALU 50 is fed-back to an input via a 40-bit accumulator register 54. The main task of the ALU 50 is to accumulate the output data of the multiplier element 48; in this respect input multiplexers are suitable units for introducing the correct scale values. The rounding off to 24 bits is also performed in the ALU (be it that this requires some processing time). The 24-bit result again fits in the register 52. The load and hold control signals for this purpose are separately shown.

Activated by a 3-bit control signal, the element 56 looks after overflow conditions and clipping operations. These operations will be described in detail with reference to FIG. 3.

In addition to the 24-bit data bus 74 and the 12-bit coefficient bus 78 there is provided a two-bit control bus 76 on which a bus protocol is maintained for transporting the data, organized as 8-bit bytes, between the various elements connected (sometimes also 12-bit symbols). One line carries the data, while the second line carries a symbol-wise organized enable signal. The bit synchronization is provided by the clock frequency of a clock which forms part of the data processor but which is not separately shown, said clock having a clock frequency of 6 MHz. This is very high in comparison with the maximum bit frequency of approximately 100 KHz defined in accordance with the I²C protocol. The series/parallel converter for data and addresses which is connected to the bus 76 and which serves for the coefficient memory 60 has already been discussed. Also connected to the bus 76 is a monitor element 40 for monitoring the transport on the data bus 74; under the control of the signal CLM, each time a data word transport can be detected, for example by means of a bit-wise OR-operation over the full width of the data path. The detection result can be applied as an activation signal to a host computer which is connected to the interface element 72 via said I²C-bus. (For the remainder, this connection serves mainly for applying data to the data processor of FIG. 1).

Finally, there is provided a second series/parallel converter 70 for converting data which is serially received via the interface unit 72 and which is transported on the bus 76 into parallel 8-bit address words in order to load the program counter 68. The latter receives a load control signal LD and counts at said frequency of 6 MHz under the control of said local clock signals. The signal CL acts as an enable signal; in given circumstances it will be necessary to halt the operation of the program counter 68 for some time. In the present embodiment the program memory 66 has a capacity of 192 words of 35 bits each (this word length, of course, is chosen as desired). Via decoding elements (not separately shown for the sake of simplicity), the program words control the control logic (not shown) of the data path and further elements of the circuit such as an address selector 30, the read/write memory 60, various registers and selectors, processing elements (48, 50); the microcode output "μC" is symbolically indicated. The code does not comprise a branch, so that incrementation can be continued until a new address is loaded. The synchronization signals are supplied by the element 64 under the control of external clock signals of 22 kHz, 44 kHz of 88 kHz and a two-bit frequency selection signal from the memory 66. The external frequencies are given by the use for audio signals. If these audio signals have a recurrency frequency of, for example, 44 kHz, a similar signal processing series is completed during each recurrency period. Subsequently, the next audio signal is awaited. In the longer term (seconds or minutes), the program can be changed by means of an updated set of coefficients in the memory 60. For synchronization purposes the element 64 also receives the signal having the local clock frequency (6 MHz).

BRIEF DESCRIPTION OF THE OPERATIONS

Some of the operations in a data processor of this kind may be, for example,:
  equalizing (compensating of response curves) of the audio amplitude;
  compression (changing the ratio between the highest and the lowest audio amplitude);
  reverberation (superposing "old" audio amplitudes on "new" audio amplitudes by delay in time); furthermore, first-order and second-order filter functions can be implemented. This involves the addition of a series of products of one data value and an associated coefficient value. The delay by one audio signal value can then be used. Other customary operations are:
  rectifying, that is to say the multiplication of a data value by its sign, so that always a positive result is obtained;
  adapted amplification, where the "coefficient" is determined as the output result of a control filter;
  signal conditioning by cutting off to a maximum value $(+1)$ or $(-1)$;
  rounding off (truncating) a result of the ALU 40 in that the 12 least-significant bits (of the 40) are omitted or adding the sign bit at the area of the least-significant bit of the remainder; these are conventional operations in two's complementation notation;
  the determination of the maximum of two signal values, which is performed as $\frac{1}{2} \times |A - B| + \frac{1}{2} \times (A + B)$.

THE ORGANIZATION OF THE OPERATIONS

Figure 2A:
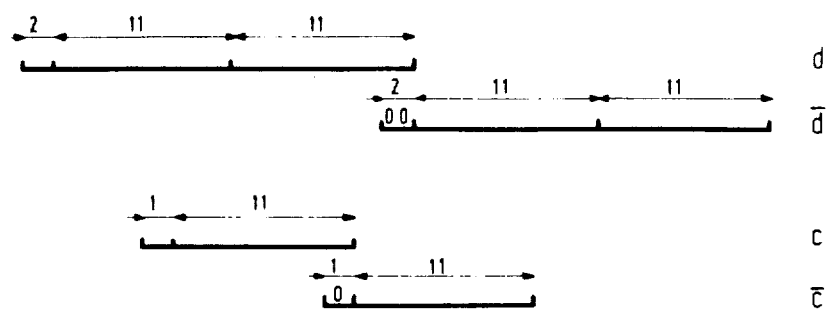
FIGS. 2a, 2b show the data structure and a processing diagram for an operation in multiple precision.

FIG. 2a symbolically shows the structure of data (d) and coefficients (c). The heavy lines indicate a bit series; the most significant bit is shown at the left in the Figure. The thin lines indicate the number of bits. The quantities are defined in the two's-complement notation. The most-significant part (d) of the data consists of 24 bits, including the conventional sign bit. The least significiant part of the data ($\bar{d}$) consists of 24 bits, the most-significant bits being void and having the values "00". The precision can be increased accordingly in steps of $22(=2n-2)$ bits. The most-significant part of the coefficients (c) consists of 12 bits, including the conventional sign bit. The least-significant part ($\bar{c}$) of the coefficients consists of 12 bits, the (single) most-significant bit being void and having the value "0". The precision can thus be expanded in steps of $11(=n-1)$bits. The multi-precision quantities must then be stored in several address locations of the relevant memories. If necessary, less-significant parts of a data quantity are supplemented by dummy bits.

Figure 2B:

FIG. 2b shows the sequence of the steps for executing a multiplication both data and coefficient having double precision (so $24+22=46$ bits at the most and $12+11=23$ bits at the most, respectively). The first line represents the multiplication of the two least-significant parts ($\bar{c}$) and ($\bar{d}$). Subsequently, there is a shift of step of 11 bits to the right and the result is added to the newly formed product (c)×($\bar{d}$). The shifting in the Figure is indicated in that the newly formed product is positioned more to the left over a distance of 11 bits. This operation is subsequently executed for the products ($\bar{c}$)×(d) and (c)×(d). The result is available with more than double the data precision as shown at the bottom in the Figure. The least-significant operations are thus performed first. It is to be noted that within the operations for one data word this has consequences as regards the memory 32, because the element 38 receives the data values with the most-significant parts in front. The facilities required for shifting will be described with reference to FIG. 3.

The results are stored as follows: after the third multiplication (including accumulation), the 11 least-significant bits are applied to register 114 in FIG. 3. After the fourth multiplication (including accumulation), the 11 least-significant bits are transferred from the register 114 to the register 116, the eleven bits of next-higher significance are transferred to the register 114, and the most-significant part is transferred to the register 112.

DESCRIPTION OF THE REGISTER ORGANIZATION

Figure 3:
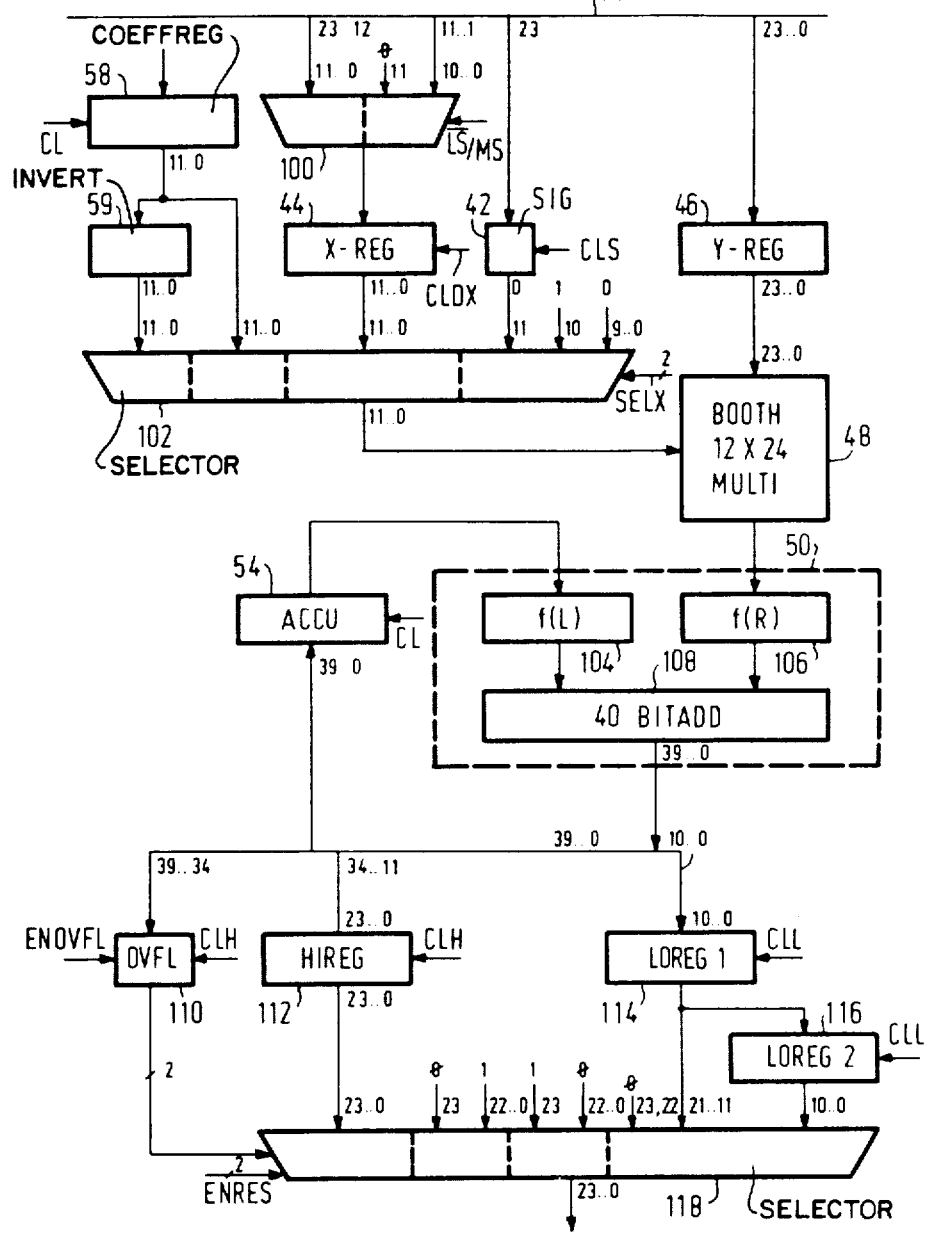
FIG. 3 shows a further organization of some registers.

FIG. 3 shows a more detailed organization of the registers on the basis of FIG. 1. Corresponding parts are denoted by the same reference numerals. The numbering of the bit positions is also shown. Via a selector 100, the data bus 74 is connected to the X-register 44. The signal MS/$\overline{\text{LS}}$ alternately conducts the 12 most/least-significant bits to the register 44. Bit 11 of the least-significant half is given the value "0" in accordance with the coefficient convention of FIG. 2a. Coefficient bus 78 is now replaced by a selector 102. Element 42 conducts the most-significant bit (No. 23) of the data bus under the control of the signal CLS. This is supplemented by a "1" in the bit position 10 and for the remainder by ten "zero" bits. The representation of the sign of an operand is thus effected as a quantity $+\frac{1}{2}$ and $-\frac{1}{2}$, respectively (due to the specific properties of the two's-complement notation, this cannot be done exactly as $(+1, -1)$). By multiplication by its sign, a rectifying operation can subsequently be parformed on an audio value in the multiplier element.

The data is applied from the element 58 to relevant inputs of the selector 102 in non-inverted form as well as in inverted form via the element 59.

The signal SELX (2 bits) conducts no more than one of the four quantities presented to the multiplier 48: either a coefficient, or half an operand, or a sign bit. The multiplier 48 outputs a product in two's-complement notation to the selector 106. The 40-bit adder 108 is connected to the accumulator register 54 which itself is connected to the selector 104. In order to enable presentation of a 24-bit operand to the data memory (32 in FIG. 1), the 24 most-significant bits are stored in the register 112. The bits 39 . . . 45 are overflow bits. The eleven least-significant bits of the result of ALU 50 can be stored in the register 114 which also comprises a slave register 116 for 11 bits also. The registers 114, 116 can together present, with suppletion of two most-significant "zero" bits, a 24-bit operand to the selector 118. This selector also receives an operand (01111 ... (which is decimal +0.99, .. ) and an operand 1000 ... (which is decimal −1). Under the control of a two-bit signal ENRES, only one of the four quantities is applied to the data bus 74. As has already been described, the registers 114, 116 allow for a multi-precision operation. The bits 23, 22 for the extreme right part of the selector 118 are the "zero" dummy bits described earlier. The lower part (elements 110, 118) of this Figure is a detailed representation of the elements 52, 56 in FIG. 1.

Figure 4:
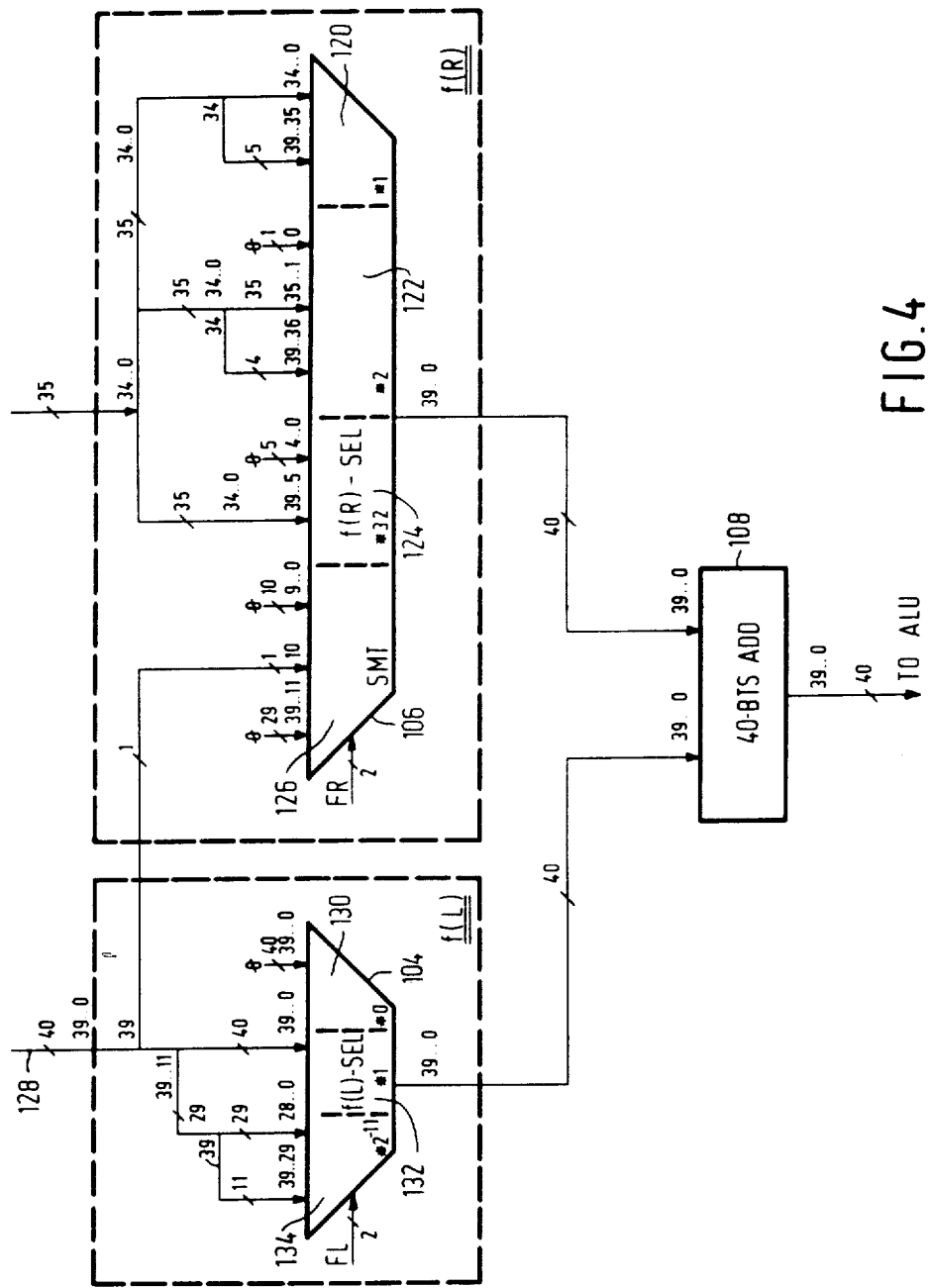
FIG. 4 shows the organization of two selectors.

FIG. 4 is a detailed representation of the organization of the selectors 104, 106. The selector 106 is fed by the multiplier 48. The 36-bit operand can first of all be applied as usual to the part 120, the most-significant bit being copied five times on bits of higher significance; this is the customary "sign extension". This means that the operand is multiplied by "1". The operand is also applied to the part 122 with suppletion by a least-significant "0" and copying of the most-significant bit (34) on four bits of higher significance (39 ... 36). This means that the operand is multiplied by "2". The operand is also applied to the part 124 with suppletion by five least-significant zeroes. This means that the operand is multiplied by "32". Input 128 is connected to the accumulator 54 of FIG. 3. The most-significant bit thereof is applied to the part 126 of the selector 106 with suppletion by ten less-significant "0" bits and 20-more-significant "0" bits. One of the known types of rounding-off is thus implemented, taking into account the sign as well as the value (sign-magnitude truncation). A two bit selection signal FR conducts one of the four operands received to the 40-bit adder 108.

The selector 104 is fed by the accumulator register 54. The 40-bit operand can first of all be applied to the part 132 in the usual manner. The 29 most-significant bits of the operand can be applied secondly to the part 124, the most significant bit (39) being copied eleven times on the input bits of higher significance of this selector part. This means that the relevant operand is multiplied by 1/2048 ($2^{-11}$). Finally the part 130 receives an operand which consists entirely of "0" bits. A two-bit selection signal FL conducts only one of the three quantities received to the adder unit 108.

DESCRIPTION OF THE INPUT/OUTPUT STRUCTURE

Serial and parallel-operating connection units are provided for the exchange of data with inter alia other digital signal processors, D/A and A/D converters, an external memory and a host microprocessor.

The serial connections have already been briefly mentioned. The bit rate of each connection is controlled by a relevant clock which is situated outside the data processor and which operates independently of the clock of the data processor itself (the latter has not been shown for the sake of clarity). The connection elements comprise synchronization means which are activated by the relevant clock.

Figure 5A:
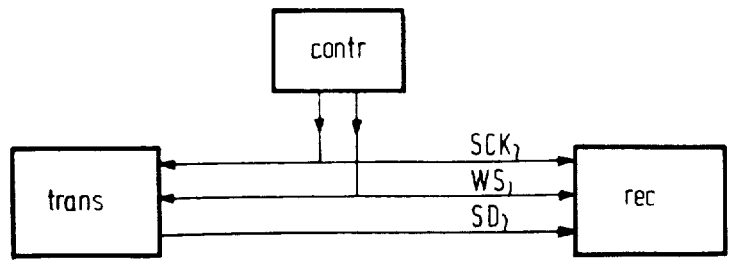
FIGS. 5a, 5b, 6a, 6b, 7, 8 show the data input/output organization.
Figure 5A:
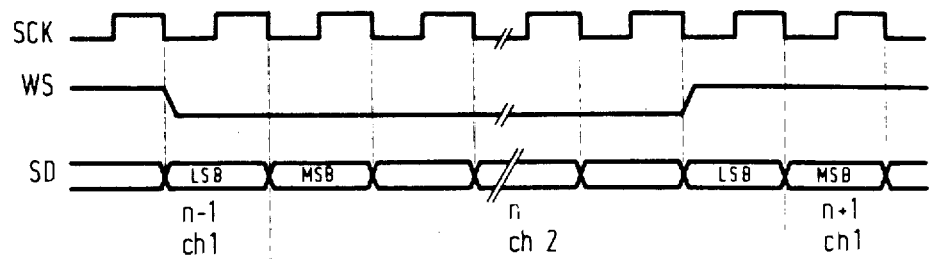

FIG. 5a shows the relevant sub-stations: the transmitting station is shown at the left and the receiving station is shown at the right; the control station is shown at the top.

Figure 5B:
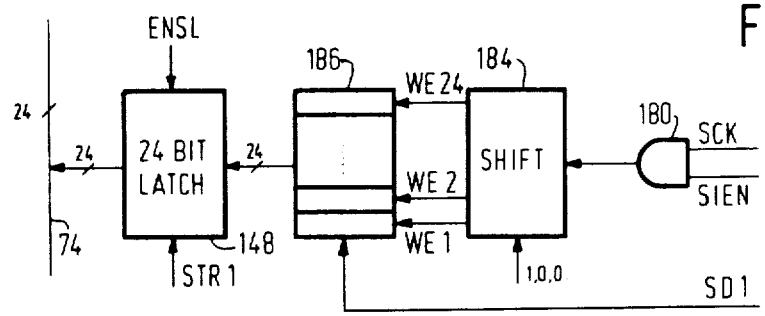

FIG. 5b shows the appropriate synchronization protocol. The data is despatched with the most-significant bit in front. The synchronization signal SCK synchronizes the bits in this sequence. The synchronization signal WS always produces a transition at the beginning of the least-significant bit of a multibit word. Thanks to this configuration, the precision of an audio data received need not be known in advance at the receiver, because it is informed of the precision by the signal WS.

Figure 6A:
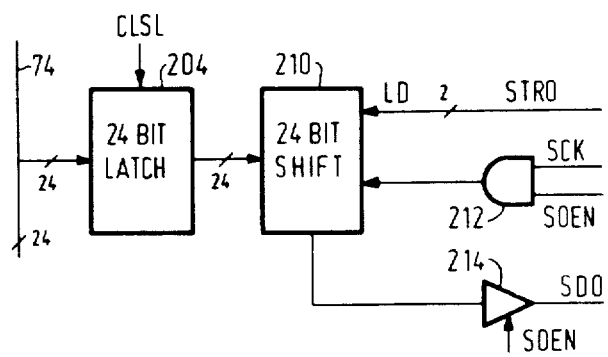
Figure 6B:
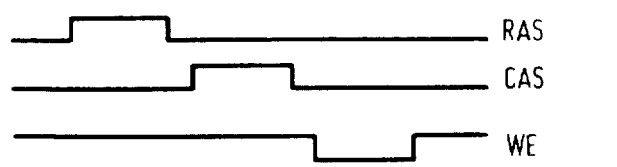

FIGS. 6a, 6b show a facility for one of the serial input connections for performing a conversion between external and internal data signals. The format of the external data signals in series representation may have a maximum length of 24 bits. FIG. 6a concerns the input. The parts 74, 148 have already been described. The input synchronization is provided by an AND-gate 180. The shift register 184 serves for alignment and, under the control of the clock pulses from the gate 180, it stores a "1" which is followed exclusively by zeroes. The output signals of the shift register on the parallel output thus contain a single "1" and 23 "0" bits, the 1 being shifted through one position in reaction to each clock pulse. The output signal of the shift register 184 serves as a write control signal (address) for a 24×1 bit memory 186 which receives the data SDI. Similarly, FIG. 6b concerns the output. The trigger register 204 receives the bits in parallel. Subsequently, they are transported to the shift register 210 under the control of a load signal STRO. The shifting out of the series of bits is controlled by the output signal of the AND-gate 212 which receives the signals SCK and SOEN.

Figure 7:
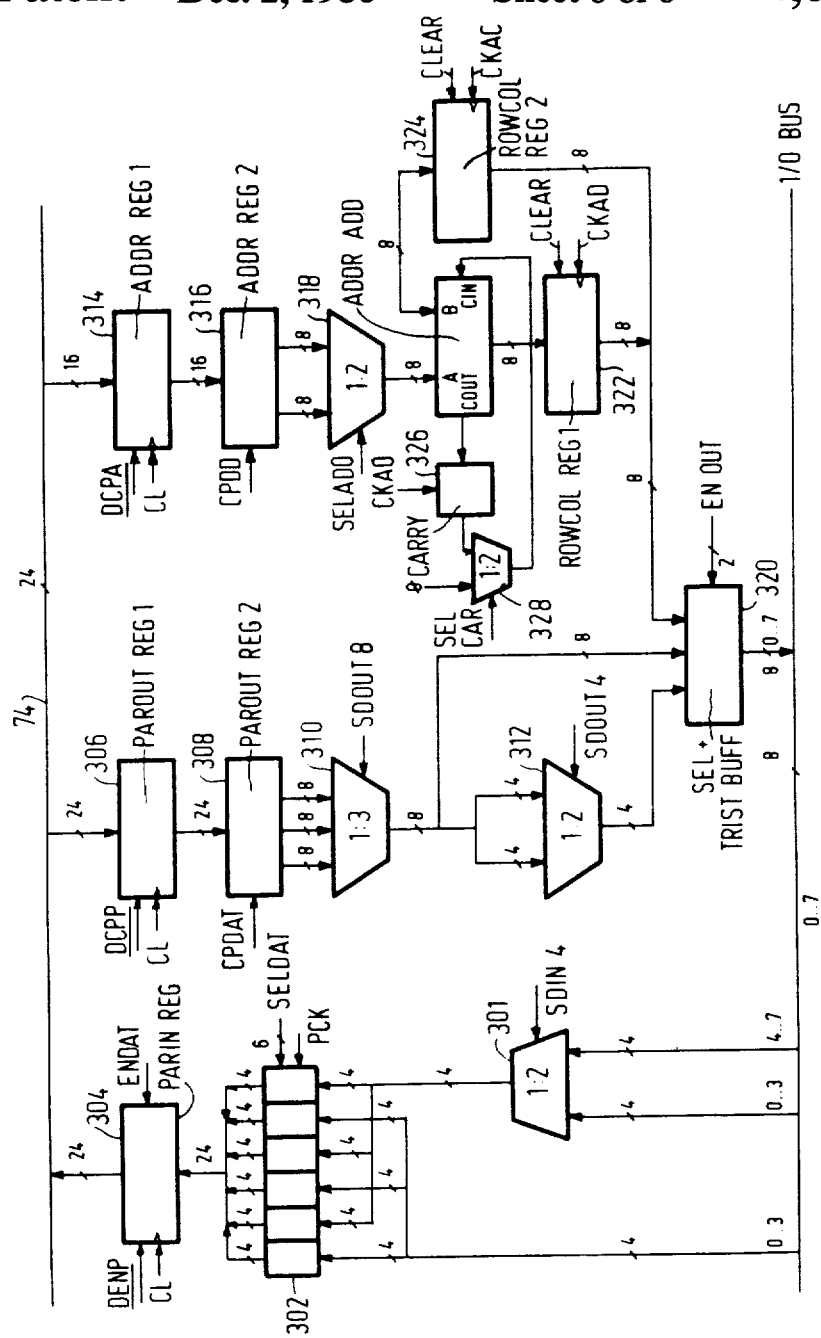

FIG. 7 shows the organization of the parallelwise data communication with the environment which has already been briefly described with reference to the element 38 in FIG. 1. Corresponding elements are denoted by the same reference numerals. For the data input the external bus 300, having a width of 8 bits, is connected to the selector 301 and to the register 302. The selector 301 conducts the bit positions 0 ... 3 or the bit positions 4 ... 7 to the register 302 under the control of the signal SDIN4. The register 302 has a width of 24 bits, like the bus 74. It receives a load control signal PCK and a six-bit selection signal SELDAT. For this six-bit signal an arbitrary selection from the six four-bit sections of the register 302 can be made (many combinations are not used in practice). The register 302 can thus be filled with the data bytes of the bus 300 in three steps. Using the selector 301, one half byte can also be written in the bit positions 0 ... 3 in an arbitary register section. When the register 302 contains an adequate amount of data, the latter is transferred to the 24-bit register 304. The synchronization "inside" and "outside" the data processor is thus uncoupled. The register 304 also receives a load control signal DENP, a clock signal CL having said internal 6 MHz frequency, and an enable signal ENDAT for controlling the tristate buffer of this register.

Figure 8:
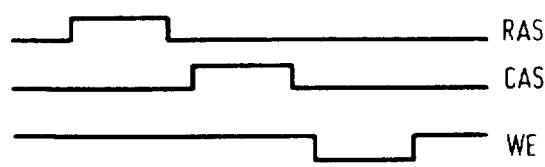

For data output there are first of all provided two registers 306, 308 which have a width of 24 bits. The register 306 receives a load control signal DCPP and a 6 MHz clock signal CL. The register 308 receives a takeover control signal CPDAT. The output of the register 308 is connected to a selector 310 in order to apply one of the three bytes to the data bus 300. A second selector 312 forms the pendant of the selector 301 in order to enable each half byte of the register 308 to be applied as desired to the bit positions 0 ... 3 of the bus 300. Further facilities are provided for the processing of addresses. These addresses have a length of 16 bits and appear on a predetermined selection of 16 bus lines in the bus 74. The register 314 and 316 correspond to the registers 306, 308 and have their own load control signals and a 16-bit capacity. The selector 318 transfers one of the two address bytes under the control of a signal SELAD0 (1 bit). The address adder 320 is capable of adding two eight-bit addresses/address portions, starting with the least-significant address portion. Its comparant is then stored in the two eight-bit registers 322, 324, so that an address accumulator is formed; a special aspect is that the accumulator registers are thus connected in series. Any carry signal of the least-significant address portion is temporarily stored in the bit stage 326 which is fed back, via a selector 328, to the carry input of the adder 320. Also shown are a load control signal CKAD, erase control signals CLEAR, and a selection SELCAR which actually serves to ignore the carry signal because the second input of the selector 328 receives a $\phi$ signal. A final selector 330, controlled by a two-bit signal EXOUT, selects the byte to be applied to the bus 300. This address-forming organization is chosen notably to enable connection of a dynamic read/write memory RAM. FIG. 8 shows the time sequence of timing signals required for this purpose.

The upper line shows the row address selection signal RAS. At the end of the pulse, the row address for the memory must be known. The second line shows the column address selection signal CAS. The column address for the memory must be known at the end of the pulse. The third line shows the write control signal WE. At the beginning of this pulse the data of the memory becomes available for a user. At the end of this pulse, data supplied by a data source is written in the memory. The memories may be of a conventional type. For the host processor use can be made of, for example a microcomputer such as the Intel 8048 manufactured by VALVO.

What is claimed is:

1. A single-chip integrated circuit data processor for the processing of wordwise receivable data, comprising:
   a. multiplier element (48) featuring a first input of n bits wide for receiving a first operand, a second input having a width of at least 2n bits but smaller than 2½n bits for receiving a second operand to be multiplied with said first operand, and a first output having a bit width that is at least equal to the sum of the bit widths of the first and the second inputs combined for presenting a product;
   b. an arithmetic and logic unit (50) featuring a third input fed by said first output, a fourth input for receiving a further operand, and a second output having a bit width that is at least equal to the bit width of said first output for presenting a result operand;
   c. retrocoupling means interconnected between said second output and said fourth input, said retrocoupling means comprising an accumulator register (54) and shift means for selectively presenting said result operand to said arithmetic and logic unit either without change of its respective bit significance levels, or with a uniform shift of its respective bit significance levels to corresponding lower significance levels, said uniform shift having a maximum that equals a plurality of successive bit steps;
   d. a multiplexed result register (52) fed by said second output in parallel to said retrocoupling means;
   e. a read/write memory (32) for storing data;
   f. bus means (74) having a bit width which is at least equal to the bit width of the second input, said bus means being connected to an output of said result register, to said first and second inputs, and bidirectionally to said read-write memory,
   g. and control memory means (60,66) for storing control information for selectively controlling operations of said first and second inputs, said arithmetic and logic unit, said retrocoupling means, said result register, and said read-write memory.

2. An integrated data processor as claimed in claim 1, characterized in that between the bus means and said first input there is also included a sign detector (42) in order to determine the sign of a data quantity obtained on the data bus in two's complement notation so as to activate, by transferring the sign information to the first input, a non-linear operation on data receivable on the second input from the bus means.

3. An integrated data processor as claimed in claim 1, characterized in that for the execution of an operation on a number of data words occupying predetermined relative addressable positions in the receiving sequence, said operation forming part of a series of operations where the sets of data words to be processed are shifted each time over one increment value in the receiving sequence, the read/write memory comprises:
   first means for storing a preset value F
   second means for incrementing said preset value by the increment value; and
   a full adder for forming a number of absolute address values by addition of the prevailing preset value and address values received.

4. An integrated data processor as claimed in claim 1 in which the control memory contains a foreground page for the control of current operations and a background page for the storage of updated control data, characterized in that said control memory comprises a fast copying facility for sequentially transferring the data of a background page updated last to the foreground page under the control of an "end of update" signal.

5. An integrated data processor as claimed in claim 4, further including, for the execution of an operation which forms part of a series of operations, means to effect said fast copying facility synchronously with an operation of said series, the background page then being controlled as the foreground page.

6. An integrated data processor as claimed in claim 1, further including data connection means formed as a parallel connection for the byte-wise communication of data words and as at least one serial connection having a width of 1 bit for communicating data and/or control information, synchronized by means of clock signals (WS, SCK), on at least one further serial connection having a width of at least 1 bit.

7. An integrated data processor as claimed in claim 1, characterized in that the arithmetic and logic unit comprises a rounding-off device for performing, on the basis of the value of a data word, a truncating operation on at least one least-significant bit position thereof.

8. An integrated data processor as claimed in any one of the following claims 1, 2 through 6, or 7, wherein the multiplier element and the arithmetic and logic unit include means to perform a double-precision operation on data values received on said second input in two's-complement notation.

9. An integrated data processor as claimed in any one of the following claims 1, 2 through 6 or, characterized in that the multiplier element and the arithmetic and logic unit include means to perform a double-precision operation on coefficient values received on said first input in two's-complement notation.

10. An integrated data processor as claimed in any one of the following claims 1, 2 through 6, or 7 characterized in that a parallel connection to the bus connection means is provided in order to present two half addresses, that is to say a row address and a column address, together to the environment in synchronism with a row address selection signal and a column selection signal, respectively, followed by a read/write enable signal for adaptation to a dynamic random access read/write memory.

11. An integrated data processor as claimed in claim 1, characterized in that the arithmetic and logic unit include a shift facility over 1 bit with respect to the coefficients.

12. An integrated data processor as claimed in claim 11, characterized in that said shift facility can be selectively activated over several bit shifts.

13. An integrated data processor as claimed in claim 1, characterized in that the operating width of the second output is larger than the operating width of the first output.

* * * * *

UNITED STATES PATENT AND TRADEMARK OFFICE
CERTIFICATE OF CORRECTION

PATENT NO. : 4,627,021

DATED : December 2, 1986

INVENTOR(S) : ERIC H.J. PERSOON ET AL

It is certified that error appears in the above-identified patent and that said Letters Patent is hereby corrected as shown below:

In the Claims:

Claim 9, line 2, after "or" insert --7--

Signed and Sealed this

Seventh Day of April, 1987

Attest:

DONALD J. QUIGG

Attesting Officer

Commissioner of Patents and Trademarks